Patented Nov. 6, 1923.

1,472,791

UNITED STATES PATENT OFFICE.

WILLIAM M. DEHN, OF SEATTLE, WASHINGTON.

PROCESS OF MANUFACTURING AMMONIUM PICRAMATE.

No Drawing.   Application filed January 9, 1920.   Serial No. 350,313.

*To all whom it may concern:*

Be it known that I, WILLIAM M. DEHN, a citizen of the United States, and a resident of Seattle, county of King, and State of Washington, have invented certain new and useful Improvements in Processes of Manufacturing Ammonium Picramate, of which the following is a specification.

My invention relates to a process of manufacturing ammonium picramate.

The production of ammonium picramate, so far as I am aware, has heretofore involved the use of a cold alcohol solution of picric acid. As picric acid is not over 5 to 6% soluble in alcohol at the temperatures permissible, this requires large quantities of alcohol with the consequent necessity of using unduly large vessels and apparatus in order to obtain substantial quantities of the desired product. With use of alcohol the ammonium picramate obtained is frequently contaminated with unchanged picric acid, and di-amino and tri-amino by-products are formed to a considerable extent. The recovery of the ammonium picramate produced is either indirect or difficult and expensive, and the product is usually subjected, during recovery, to more or less hydrolysis and oxidation, yielding a darkened product deficient in ammonia.

These difficulties are entirely or substantially overcome by my process.

According to an embodiment of my improved process, picric acid, either dry or moistened with water, and preferably in a fine state of division, is placed in a closed reducer equipped with suitable means for temperature control and with a stirring device which is also adapted for grinding any material which falls to the bottom. The use of a closed reducer is desirable to prevent access of atmospheric oxygen and loss of ammonia. When the temperature control and stirring devices have been set into operation a neutralizing water solution of ammonia is run in, preferably at a substantially constant rate, so regulated as to avoid undue rise of temperature. The amount of ammonia used is less than would be required to effect complete neutralization. For example, with 200 parts of picric acid, a water solution containing about 15 parts of ammonia may be used.

Then a water solution of ammonium sulfid is run in, preferably the hydrosulphid of composition $NH_4SH$. The ammonium sulfid should be added relatively slowly while subjecting the reaction material to temperature control and efficient stirring and grinding.

The principal features to be observed are that intimate contact of reacting materials shall be obtained with substantial avoidance of local chemical excess of ammonium sulfid, and avoidance of undue rise of temperature. In general, hours are required for the addition of the ammonium sulfid in order to obtain desirably good results.

When the reaction is complete the resulting semi-solid mass, blood red and substantially free from picric acid, is filtered or centrifuged.

Part of the filtrate is used to neutralize fresh quantities of picric acid in the manner already described. The greater part of it, however, is subjected first to distillation to recover ammonia, and then to evaporation to recover ammonium picramate. Here about 10% of ammonium picramate of a relatively inferior quality is obtained.

The solid portion obtained from the filter, centrifuge or the like, without washing, is dried, preferably under reduced pressure and at a comparatively low temperature. After drying it is powdered, and washed with carbon bisulfid to remove sulfur. From the carbon bisulfid solution both sulfur and carbon bisulfid may be easily recovered in pure form. After again drying, preferably under reduced pressure, the ammonium picramate is a brilliant red brown and completely soluble in water. This product is equal to about 90% of the theory, and therefore, with the ammonium picramate recovered from the filtrate, nearly quantitative yields are obtained by my improved process. When the ammonium picramate is to be used directly for the manufacture of diazodinitrophenol, in accordance with my application Ser. No. 343,592, filed December 9th, 1919, it is first washed with carbon bisulphid and then with alcohol but is not dried.

The quantities of materials used are substantially in accordance with the equation:

$$C_6H_3O_7N_3 + NH_3 + 3NH_4SH \rightarrow C_6H_5O_5N_3 + 4NH_3 + 3S + 2H_2O$$

For example the following quantities by weight may be used:

Picric acid about 200 parts, ammonia about 15 parts dissolved in water about 37–100 parts, ammonia sulfid about 134 parts dissolved in water about 1340 parts.

Somewhat less ammonia may be initially used because of the free ammonia supplied for the remainder of the picric acid by reaction of ammonium sulfid with part of the picric acid. Advantageously aqueous filtrate from prior charges may be used for this purpose.

With about the quantity of ammonium sulfid named, the desired reduction is successfully performed. and not enough of the ammonium sulfid is present to exercise a solvent effect on precipitated sulfur, or to exercise a reducing effect on ammonium picramate. By keeping the temperature under about 40° C. and adding the ammonium sulfid solution slowly, with efficient stirring and grinding, local over reduction and other undesirable local reactions are prevented, as also the production of di-amino and tri-amino by products, and high yields of desirably good product obtained.

Modifications and changes may be resorted to, within the scope of my claims, without departing from my invention.

I claim:

1. The process of making ammonium picramate, which comprises reacting on picric acid with a water solution of ammonia less in amount than would be required to completely neutralize the picric acid, and thereafter reacting on unchanged picric acid and the products of the first reaction with a water solution of ammonium sulfid.

2. The process of making ammonium picramate, which comprises reacting on picric acid with a water solution of ammonia, less in amount than would be required to completely neutralize the picric acid, and thereafter reacting on unchanged picric acid and the products of the incomplete reaction with substantially the stoichiometric equivalent of ammonium hydro sulfide.

3. The process of making ammonium picramate, which comprises reacting on picric acid with a water solution of ammonia and with a water solution of ammonium hydrosulfide, of known concentration the latter added in a quantity slightly less than the stoichimetric equivalent of the quantity of picric acid used to insure the desired reduction to ammonium picramate whereby the quantity of ammonium hydrosulfide present is insufficient to exercise a solvent effect on precipitated sulphur or to exercise a reducing effect on ammonium picramate.

4. The process of making ammonium picramate, which comprises reacting on picric acid with a water solution of ammonia and with a water solution of ammonium hydrosulfide in a closed reducer at a temperature not above 40° C. so that reduction progresses regularly to the desired end product without substantial atmospheric oxidation.

5. The process of making ammonium picramate, which comprises reacting on picric acid with a water solution of ammonia and with a water solution of ammonium hydrosulfide, in a closed reducer at a temperature not to exceed 40 degrees C., whereby ammonium picramate is produced, without substantial atmospheric oxidation.

6. The process of making ammonium picramate, which comprises reacting on picric acid at a temperature not over 40° C., with a water solution of ammonia and with a water solution of ammonium hydrosulfide, at a very slow rate so that picric acid and ammonium picramate can be dissolved and reduced substantially without yielding over-reduction products.

7. The process of making ammonium picramate, which comprises reacting on picric acid with a water solution of ammonia and with a water solution of ammonium hydrosulfide, at such a rate that picric acid and ammonium picramate is dissolved and reduced substantially without yielding over-reduction products, while keeping the temperature at not to exceed 40 degrees C.

8. The process of making ammonium picramate, which comprises reacting on picric acid with a water solution of ammonia and with a water solution of ammonium hydrosulfide, the resulting solids and liquids being brought into intimate contact by grinding and stirring, so that the desired chemical reaction may be accelerated and completed without loss of material and without permitting local excessive reduction or other side reactions.

9. The process of making ammonium picramate, which comprises reacting on picric acid with a water solution of ammonia, and with a water solution of ammonium hydrosulfide, filtering without washing and under reduced pressure so as to secure substantially a minimum loss of ammonia and a minimum influence of atmospheric oxygen.

10. The process of making ammonium picramate, which comprises reacting on about 200 parts of picric acid with about 15 parts of ammonia, contained in from 37 to 100 parts of water, reacting on the reaction product so obtained with about 134 parts of ammonium hydrosulfide contained in about 1340 parts of water, confining the materials during reaction to prevent access of atmospheric oxygen and escape of ammonia, agitating and grinding the materials together to secure a complete admixture and reaction while maintaining the temperature at not exceeding 40 degrees C., separating the liquid and solid products obtained as by filtering, distilling the filtrate for recovery of ammonia and evaporating the same for recovery of ammonium picramate, drying the solid material remaining after the filtration, powdering same, treating same with carbon bisulfid for removal of sulphur, and drying the residue under reduced pressure.

In testimony that I claim the foregoing, I hereto set my hand, this 27 day of December, 1919.

WILLIAM M. DEHN.